Patented Mar. 25, 1924.

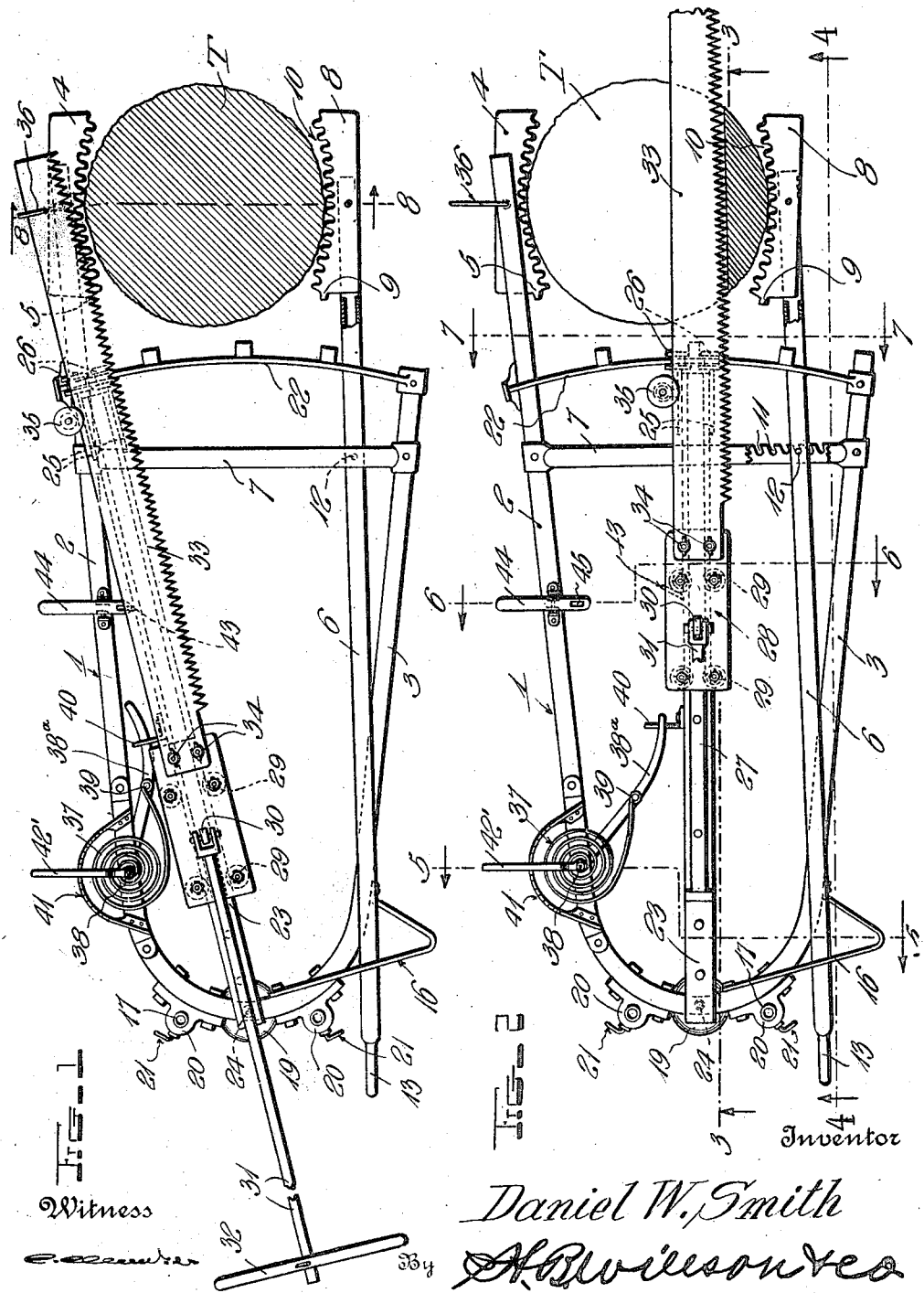

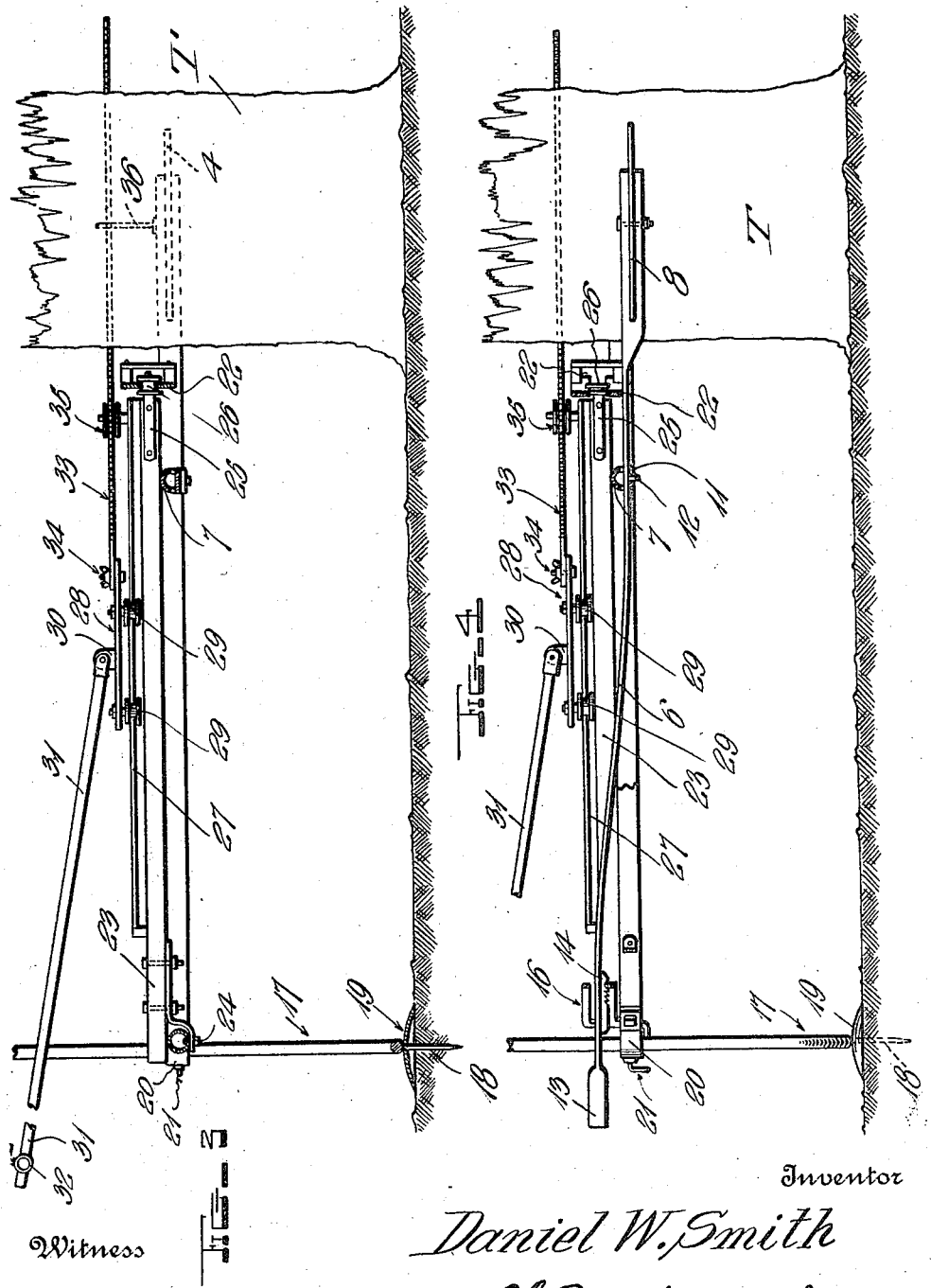

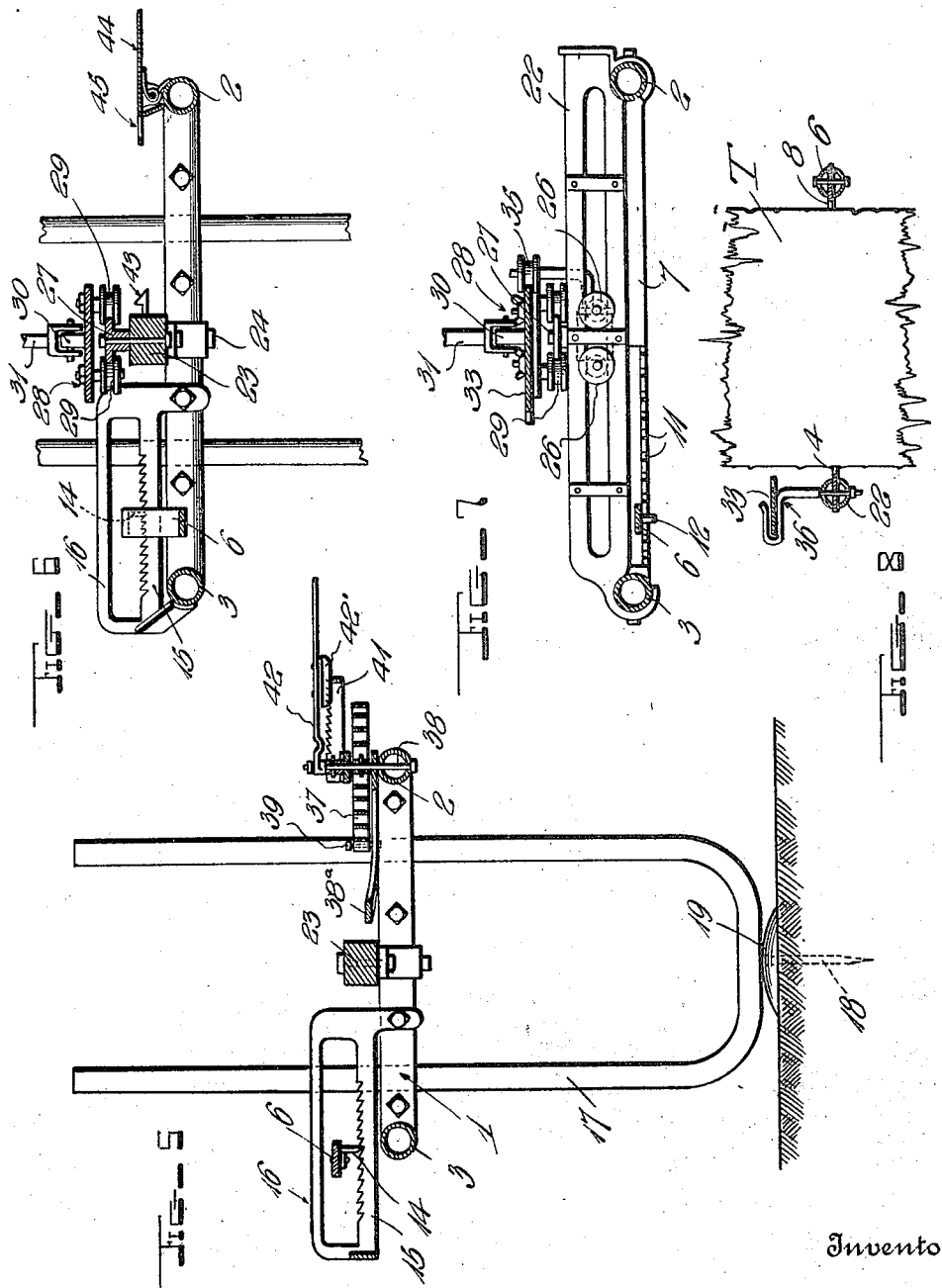

1,488,073

UNITED STATES PATENT OFFICE.

DANIEL W. SMITH, OF BANGOR, MAINE.

SAWING MACHINE.

Application filed December 29, 1921. Serial No. 525,582.

*To all whom it may concern:*

Be it known that I, DANIEL W. SMITH, a citizen of the United States, residing at Bangor, in the county of Penobscot and State of Maine, have invented certain new and useful Improvements in Sawing Machines; and I do declare the following to be a full, clear, and exact description of the invention such as will enable others skilled in the art to which it appertains to make and use the same.

This invention relates to an improved sawing machine which is especially, but not necessarily, designed for felling large trees, the same being designed to be operated by manual power.

The principal object of the invention is to generally improve upon my Patent No. 1,371,122 granted to me on March 8, 1921.

By reviewing the above named patent, it will be seen that the horizontally movable longitudinally reciprocated saw is directly connected with the horizontally movable track by means of rollers. It is now desired to improve upon this construction by providing a special carriage which is connected with this track and to detachably connect the saw with this carriage so that it can be easily and readily removed for sharpening or to permit another fine or coarse saw to replace it.

Another feature of construction in favor of the present invention is the pivoted tree-engaging jaws which have their toothed sides shaped to conform to the tree as much as possible, one of these jaws being carried by one arm of the stationary supporting frame and the other one being carried by the movable rod supported on the frame to permit the entire machine to be very quickly disengaged from the tree when the latter starts to fall. Inasmuch as these machines are often broken by the falling tree, this quick detachable feature will be no doubt appreciated.

A further and very important constructional feature embodied in the present application is the novel adjustable spring device which co-acts with the saw and parts which carry it to automatically feed the saw through the tree as it is longitudinally moved, this arrangement being advantageous in that the spring tension may be varied during the operation of the machine.

Another structural difference appearing in the improvement and not in the patented machine, is a novel foot-actuated latch which is employed for holding the saw and other parts to the extreme left against the action of the spring feed means. This detail will be found advantageous in that it will hold the saw in an out-of-the-way position to enable the jaws to be easily and readily engaged or disengaged.

It is also desirable to substitute for the manually operated saw-actuating handle or lever, a pull and push device which is pivoted to the aforesaid carriage to permit it to be disposed at the proper height for convenient operation. This device is desirable because it is not limited in its pivotal movement such as is the case with the patented construction. Consequently, there is little or no chance of the operator being thrown onto the machine during the course of operation, which often happens with the construction of machine now employed.

Other constructional features and details in favor of the present invention will be set forth and made apparent by carefully reading the following description.

In the accompanying drawings forming a part of this specification and in which like numerals are employed to designate like parts throughout the same:

Figure 1 is a top plan view of the improved machine showing the parts in their normal inoperative position.

Figure 2 is a similar view showing the parts at work.

Figures 3 and 4 are longitudinal sectional views taken substantially on the planes of the lines 3—3 and 4—4 respectively of Fig. 2.

Figures 5, 6 and 7 are traverse sections taken substantially on the planes of the lines 5—5, 6—6 and 7—7 respectively of Fig. 2.

Figure 8 is a similar view, the section being taken on the line 8—8 of Fig. 1.

In carrying out the invention, I make use of a supporting frame 1 which is substantially U-shaped and is preferably formed from hollow piping bent so that the arm 2 is considerably longer than the arm 3 and extends some distance beyond the free end of the arm 3 and carries a pivotally mounted jaw 4. This arm 2 is simply slotted at its outer end to permit the jaw to be connected therewith and inasmuch as the latter is equipped with a stop 5, it will be seen that its pivotal movement in one direction is limited. A rod 6 is movably and detachably supported on the combined brace and cross-piece 7 and is formed at its outer end with a slot in which a second jaw 8 is pivotally mounted. This last named jaw is likewise equipped with a stop-lug 9 and both jaws have their inner toothed edges curved as indicated at 10 to conform to the curved surface of the tree T. Referring again and more specifically to the manner in which the rod 6 is connected with the cross-piece 7, it will be seen that the latter is formed with a slot and plurality of closely spaced seats or notches 11 and that the rod 6, which extends through the slot, carries a lateral stud 12 which is adapted to be received in one of these seats. While on this rod 6, it may be well to state that it is equipped at its opposite end with a hand-grip 13 and carries a stationary dog 14 (see Fig. 5) which is engageable with the teeth of the rack 15 forming a part of the bracket 16 which is secured to the bend or bight portion of the frame. By directing attention to Fig. 4, it will be seen that the rod 6 is bent between its ends to permit the hand gripping portion to be extended up and over the upper side of the supporting frame to be engaged with said bracket. By so bending the rod, the jaw which it carries is disposed directly opposite the other jaw and an effective grip on the tree is insured. A suitable substantially U-shaped supporting device 17 having an anchoring spur 18 and a stop plate 19 is employed for supporting the outer end of the frame 1 and the latter is equipped with bearing brackets 20 through which the arms of the supporting device 17 extend. Binding devices 21 serve to engage the arms of this support 17 and permit the supporting frame to be adjusted to the desired height on the arms. It may be conveniently brought in here that the supporting frame is equipped with an arcuate slotted guide member 22 which is connected with the outer end of the arm 3 and intermediate portion of the remaining arm 2 in any suitable way. This guide serves a purpose to be hereinafter described.

A carrier arm 23 is pivotally connected with the bend of the supporting frame as indicated at 24 and brackets 25 are secured on opposite sides of this arm at the end adjacent the tree and these brackets carry grooved rollers 26 which ride in the slot in said guide 22. Rigidly secured on the upper side of this carrier arm 23 is a track 27 and it is on this track that the saw carriage 28 is slidably mounted. This carriage simply comprises a plate which carries grooved rollers 29 which engage the head or flanges of the track. This carriage is equipped with an upstanding lug 30 to which the forked head of a push and pull rod 31 is pivotally connected. A handle or cross-piece 32 is adjustably connected with the outer end of this rod. It may be conveniently pointed out here, as before briefly indicated, that with my patented device and with other devices with which I am familiar, levers having limited swinging movement are employed for operating the cutting device, and actual experience has taught that because of this limited movement, the operator often loses his balance and falls onto the saw while it is in operation. By employing a push and pull rod such as I have shown, it will be seen that the same can be raised to the desired height to enable the proper leverage to be obtained and it can be swung through a greater area than the patented operating means and acts somewhat as a brace to prevent the operator from accidentally falling onto the machine while the same is in operation. Proceeding, it is to be stated that the saw 33 is detachably connected with the carriage as indicated at 34 and with this construction, it is possible to remove or replace the saw very quickly and easily whenever desired or necessary. By carefully examining the construction, it will be seen that the aforesaid track 27 carries a grooved roller 35 with which one edge of the saw is engaged. With this construction, undue movement and twisting of the saw blade is prevented and rigidity of construction insured. For supporting the outer end of the saw blade, I make use of a hook 36 which is mounted on the aforesaid arm 2 and assists in starting the saw to cut through the trunk of the tree. This hook also prevents the outer end of the saw from sagging and insures a proper position thereof preparatory to cutting.

As before indicated, the improved machine embodies means for automatically feeding the saw through the tree trunk as it is reciprocated by the manually operated means and although this means could be of some other construction, it preferably comprises a flat coiled spring 37 which has one of its ends anchored to a rotary shaft 38 supported on the arm 2 of the aforesaid frame. The outer end of this spring is connected with a lever 38$^a$ through the medium of the pin 39 and one end of this lever 38$^a$ is pivotally connected with the aforesaid shaft while the opposite end thereof is received in the slot of an angular bracket 40 connected with the aforesaid horizontally movable arm 23. An arcuate toothed rack 41 is associated with this spring device and a handle 42 is non-rotatably connected with the upper end of the aforesaid shaft, this handle carrying a stationary dog 42' to engage the teeth of the rack. It is obvious that by grasping the handle and moving it in one direction or the other, the shaft 38 will be rotated in a manner to tighten or loosen the aforesaid spring 37. Consequently, the tension of this spring device can be varied to bear a greater or less pressure against the saw while the latter is in operation.

The invention in addition to embodying the parts so far set forth includes means, as before indicated, for holding the saw in the position indicated in Fig. 1. This means in its preferred form comprises a headed member 43 (see Fig. 6) and a spring actuated foot-released trip 44 which has an aperture 45 for engaging the head of said part 43.

The operation of the machine is as follows: The saw 33 is placed in the position indicated in Fig. 1 with the outer end thereof engaged with the supporting hook 36 and the trip 44 is engaged with the head of the part 43 to hold the saw in this position against the action of the spring 37. Of course, previous to this, the jaws 4 and 8 are engaged with the tree trunk, the stud 12 carried by the rod 6 being seated in the proper notch to insure effective engagement of the jaw 8 with the tree. The rod 6 is locked in this position by means of the dog 14 and rack 15. When the sawing operation is begun, the trip 44 is simply kicked with the foot to disengage it from the part 43 and the spring 37 then comes into play and through the medium of the lever 38ª, the saw is forced into engagement with the tree. The handle 32 is then grasped and a longitudinal movement imparted to the saw by properly manipulating the push and pull rod 31. As before indicated, this rod is to be raised to the proper height to insure the proper leverage and to act as a brace for the operator's body. As the saw starts to cut through the tree, the aforesaid flat spring exerts a constant pressure against it and feeds it through the cut and holds it in effective engagement with the tree. The coacting rollers and arcuate guide insure effective operation of the saw.

By carefully considering the description in connection with the drawings, persons familiar with devices of this class will doubtless be able to obtain a clear understanding of the invention. Therefore, a more lengthy and detailed description is deemed unnecessary.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:

A sawing machine comprising a substantially U-shaped frame having one of its arms longer than the other, a horizontally swinging track mounted on the frame between the arms, a guide for the track, a longitudinally reciprocable saw mounted on said track, a push and pull rod connected with said saw, the outer end of said rod being capable of free vertical movement to permit its elevation to be varied, a crossbrace extending transversely between and connected at its end to the aforesaid arms, said brace being provided with a slot and having closely spaced notches formed on one edge of the slot, a bar extending through the slot, said bar having a lateral projection adapted to be selectively disposed in one of said notches, said bar being formed at its outer end with a slot, the outer end of the long arm of the aforesaid frame being also provided with a slot, jaws arranged in said slot and pivotally connected intermediate their ends with the arms and the bar respectively, said jaws having limited swinging movement in one direction and having their inner toothed edges shaped to conform to the trunk of a tree, and an adjustable spring device mounted on the upper side of the frame, said device embodying a pivoted spring-pressed lever engaged with the track for exerting a yielding pressure on the latter.

In testimony whereof I have hereunto set my hand.

DANIEL W. SMITH.